United States Patent
Lee et al.

(10) Patent No.: US 7,964,087 B2
(45) Date of Patent: Jun. 21, 2011

(54) METHODS AND SYSTEMS FOR FORMING COOLING HOLES HAVING CIRCULAR INLETS AND NON-CIRCULAR OUTLETS

(75) Inventors: Ching-Pang Lee, Cincinnati, OH (US);
Bin Wei, Mechanicville, NY (US);
Chen-Yu Jack Chou, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 1125 days.

(21) Appl. No.: 11/726,418

(22) Filed: Mar. 22, 2007

(65) Prior Publication Data
US 2008/0230379 A1    Sep. 25, 2008

(51) Int. Cl.
*B23H 3/04* (2006.01)
*B23H 9/14* (2006.01)

(52) U.S. Cl. .................................. 205/665; 204/224 M

(58) Field of Classification Search .................. 205/665; 204/224 M, 280
See application file for complete search history.

(56) References Cited

U.S. PATENT DOCUMENTS

| | | | |
|---|---|---|---|
| 3,803,018 A | 4/1974 | Andrews | |
| 4,250,011 A | 2/1981 | Capello et al. | |
| 4,690,737 A | 9/1987 | Vishnitsky | |
| 5,306,401 A | 4/1994 | Fierkens et al. | |
| 5,413,463 A | 5/1995 | Chiu et al. | |
| 5,416,289 A | 5/1995 | Tanaka | |
| 5,739,497 A | 4/1998 | Tanaka | |
| 5,820,744 A | 10/1998 | Edwards et al. | |
| 6,267,868 B1 | 7/2001 | Wei et al. | |
| 6,303,193 B1 | 10/2001 | Guida et al. | |
| 6,340,284 B1 | 1/2002 | Beeck et al. | |
| 6,413,407 B1 | 7/2002 | Bruns et al. | |
| 6,539,627 B2 | 4/2003 | Fleck | |
| 6,554,571 B1 | 4/2003 | Lee et al. | |
| 6,582,584 B2 | 6/2003 | Lee et al. | |
| 6,743,350 B2 | 6/2004 | Lee et al. | |
| 6,824,360 B2 | 11/2004 | Fleck | |
| 6,910,864 B2 | 6/2005 | Tomberg | |
| 6,994,514 B2 | 2/2006 | Soechting et al. | |
| 6,997,675 B2 | 2/2006 | Dube et al. | |
| 6,997,679 B2 | 2/2006 | Beddard et al. | |
| 2003/0006137 A1 * | 1/2003 | Wei et al. ....................... 204/280 |

OTHER PUBLICATIONS

U.S. Appl. No. 11/726,410, filed Mar. 22, 2007 with first-named inventor Ching-Pang Lee.

* cited by examiner

*Primary Examiner* — Alexa D. Neckel
*Assistant Examiner* — Nicholas A. Smith
(74) *Attorney, Agent, or Firm* — Armstrong Teasdale LLP

(57) ABSTRACT

A method for forming a hole in an object is provided. The method includes forming a starter hole in the object, providing an electrochemical machining electrode that includes insulation that extends only partially around the electrode, and inserting the electrode into the starter hole to form a hole in the object that has an inlet defined by a first cross-sectional area and an outlet defined by a second cross-sectional area.

14 Claims, 3 Drawing Sheets

METHODS AND SYSTEMS FOR FORMING COOLING HOLES HAVING CIRCULAR INLETS AND NON-CIRCULAR OUTLETS

BACKGROUND OF THE INVENTION

This invention relates generally to electrochemical machining (ECM), and more specifically, to methods and systems for forming cooling holes in a turbine engine airfoil.

Electrochemical machining and/or shaped tube electrochemical machining (STEM) is commonly used to form cooling holes in turbine engine airfoils. During an ECM process, the workpiece being machined is coupled to a positive terminal of a DC power supply and the electrode is coupled to a negative terminal of the DC power supply. An electrolyte flows between the electrode and the workpiece. For example, the electrolyte may be an acid or an aqueous salt solution. During the machining process, the workpiece is dissolved by controlled electrochemical reactions to form the cooling hole. Generally, such machining processes form cooling holes that have a substantially circular cross-sectional area. The cross-sectional area of each cooling hole is sized to provide a desired amount of flow metering through an inlet of the cooling hole. However, because such openings are generally substantially uniform throughout the blade, an amount of potential heat transfer inside the blade and/or the cooling hole may be limited by the circular cross-sectional profile of the opening.

In addition, a cooling hole having a circular cross-sectional area defined at its outlet may not be suitable for use in an airfoil having a narrow trailing edge. For example, a circular cross-sectional area defined at an outlet of a cooling hole extending through such an airfoil may induce high stress concentrations to the trailing edge of the airfoil. Accordingly, cooling holes having substantially constant circular cross-sectional areas may increase costs associated with maintaining a turbine engine and/or decrease the turbine engine lifespan.

BRIEF DESCRIPTION OF THE INVENTION

In one embodiment, a method for forming a hole in an object is provided. The method includes forming a starter hole in the object, providing an electrochemical machining electrode that includes insulation that extends only partially around the electrode, and inserting the electrode into the starter hole to form a hole in the object that has an inlet defined by a first cross-sectional area and an outlet defined by a second cross-sectional area.

In another embodiment, an electrochemical machining (ECM) apparatus is provided. The apparatus includes an electrode and insulation that extends only partially about the electrode. The insulation is oriented to cause the electrode to form a hole having an inlet defined by a first cross-sectional area and an outlet defined by a second cross-sectional area.

In yet another embodiment, a system for machining holes in a turbine engine component is provided. The system includes an electrochemical machining (ECM) apparatus that includes an electrode and insulation that extends only partially about the electrode. The insulation is oriented to cause the electrode to form a hole having an inlet defined by a first cross-sectional area and an outlet defined by a second cross-sectional area.

DETAILED DESCRIPTION OF THE INVENTION

The present invention provides a system that may be used to machine cooling holes in a turbine engine airfoil. The system uses a hollow electrochemical machining (ECM) electrode that has electrolyte flowing therethrough. For example, the electrolyte may be an acid or an aqueous salt solution. Prior to machining, the airfoil is coupled to a positive terminal of a DC power supply and the electrode is coupled to a negative terminal of the DC power supply. As the electrolyte flows between the electrode and the airfoil, the airfoil is dissolved by controlled electrochemical reactions to form the cooling hole.

During machining, electrolyte fluid flows through the hollow electrode to facilitate discharging a current that removes material from the airfoil. The electrode is inserted in a starter hole formed in the turbine engine airfoil to facilitate forming a cooling hole having an inlet defined by a first cross-sectional area and an outlet defined by a second cross-sectional area, as is described in more detail below.

Although, the present invention is described in terms of forming a cooling hole in a turbine airfoil, as will be appreciated by one skilled in the art, the present invention may also be applicable to forming cooling holes in other components of an engine and/or components of any other system requiring cooling holes. For example, the present invention may be used with, but is not limited to being used with, a turbine casing, exhaust pipes, and ducts. Further, although the present invention is described in terms of electrochemical machining, as will be appreciated by one skilled in the art, the present invention may also be applicable to other methods of forming cooling holes.

Figure 1:
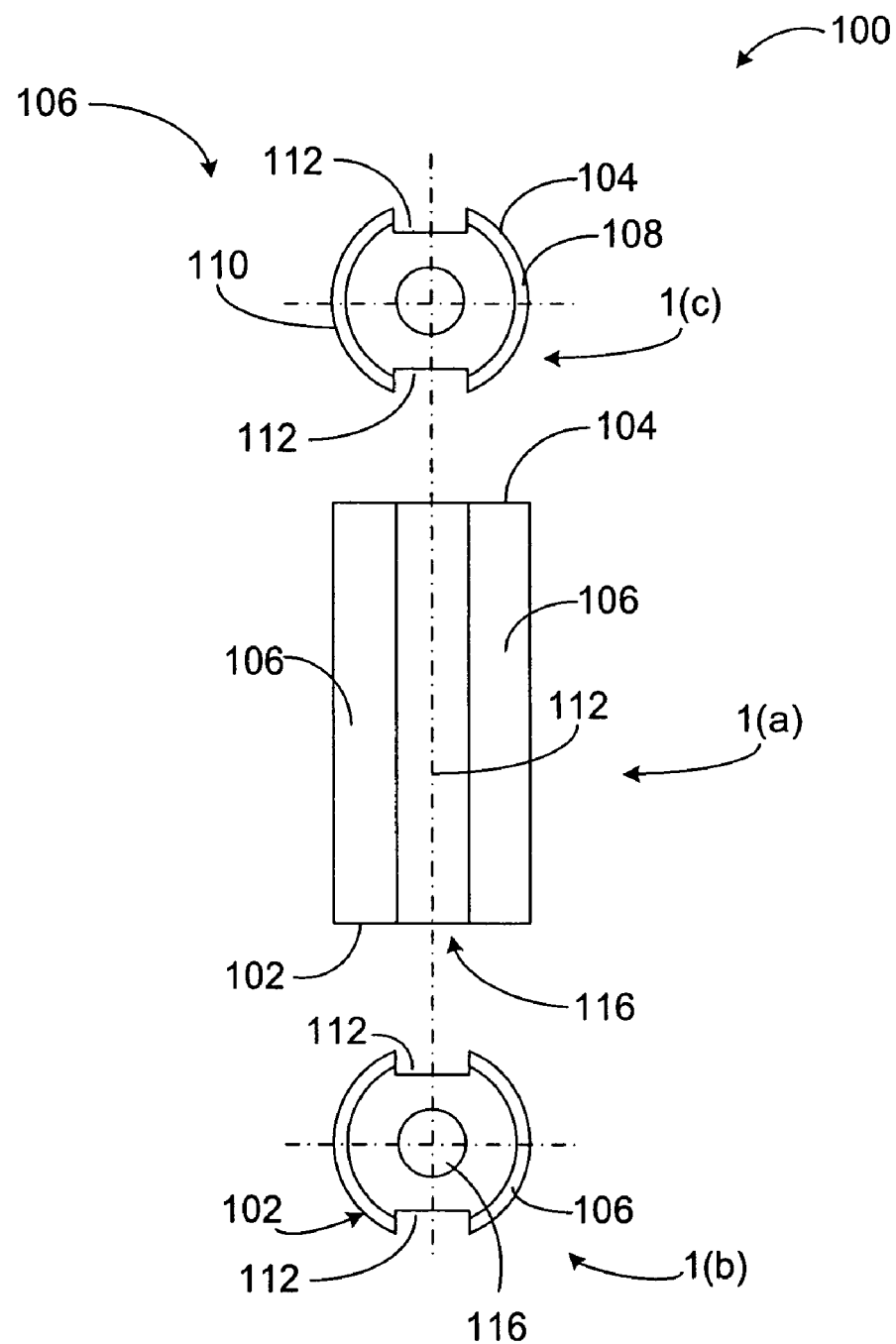
FIG. 1 is a view of an exemplary electrochemical machining (ECM) electrode.

FIG. 1 is a view of an exemplary electrochemical machining (ECM) electrode 100. Specifically, FIG. 1 illustrates a side view 1(a) of a hollow ECM electrode 100 having a first end 102 and a second end 104, an end view 1(b) of first end 102, and an end view 1(c) of second end 104. In the exemplary embodiment, electrode 100 is substantially cylindrical and is configured to channel electrolyte fluid therethrough. The electrolyte fluid serves as a medium for electrochemical dissolution to remove metal from a part being machined. The electrolyte fluid also removes dissolved metal from machining zones. As will be appreciated by one skilled in the art, electrode 100 may have any suitable shape based on the intended function thereof.

In the exemplary embodiment, electrode 100 includes insulation 106 that extends partially around electrode 100. Insulation 106 confines metal dissolution to desired areas so that a desired cooling hole size and shape can be obtained. In the exemplary embodiment, insulation 106 extends only across a first side 108 and across an opposite second side 110 of electrode 100. As such, in the exemplary embodiment, electrode 100 includes two diametrically opposite portions 112 that remain uninsulated or exposed. In an alternative embodiment, insulation 106 and uninsulated portions 112 are oriented in any orientation about electrode 100 that enables electrode 100 to function as described herein. Specifically, as will be appreciated by one skilled in the art, the configuration, number, and size of uninsulated portions 112 are variably selected based on the intended function of electrode 100, and/or an intended result of operating electrode 100.

During operation, an electric current is induced through the electrolyte fluid across electrode 100 and the part that is being machined by electrode 100. Specifically, insulation 106 causes the electric current to be discharged from uninsulated portions 112 and from a tip 116 of electrode 100. In the exemplary embodiment, tip 116 is uninsulated; however, in an alternative embodiment, tip 116 includes insulation. Because the configuration, number, and size of uninsulated portions 112 are variably selected, the configuration, number, and size of uninsulated portions 112 may be altered to vary an amount electric current discharged from tip 116 and uninsulated portions 112.

Figure 2:
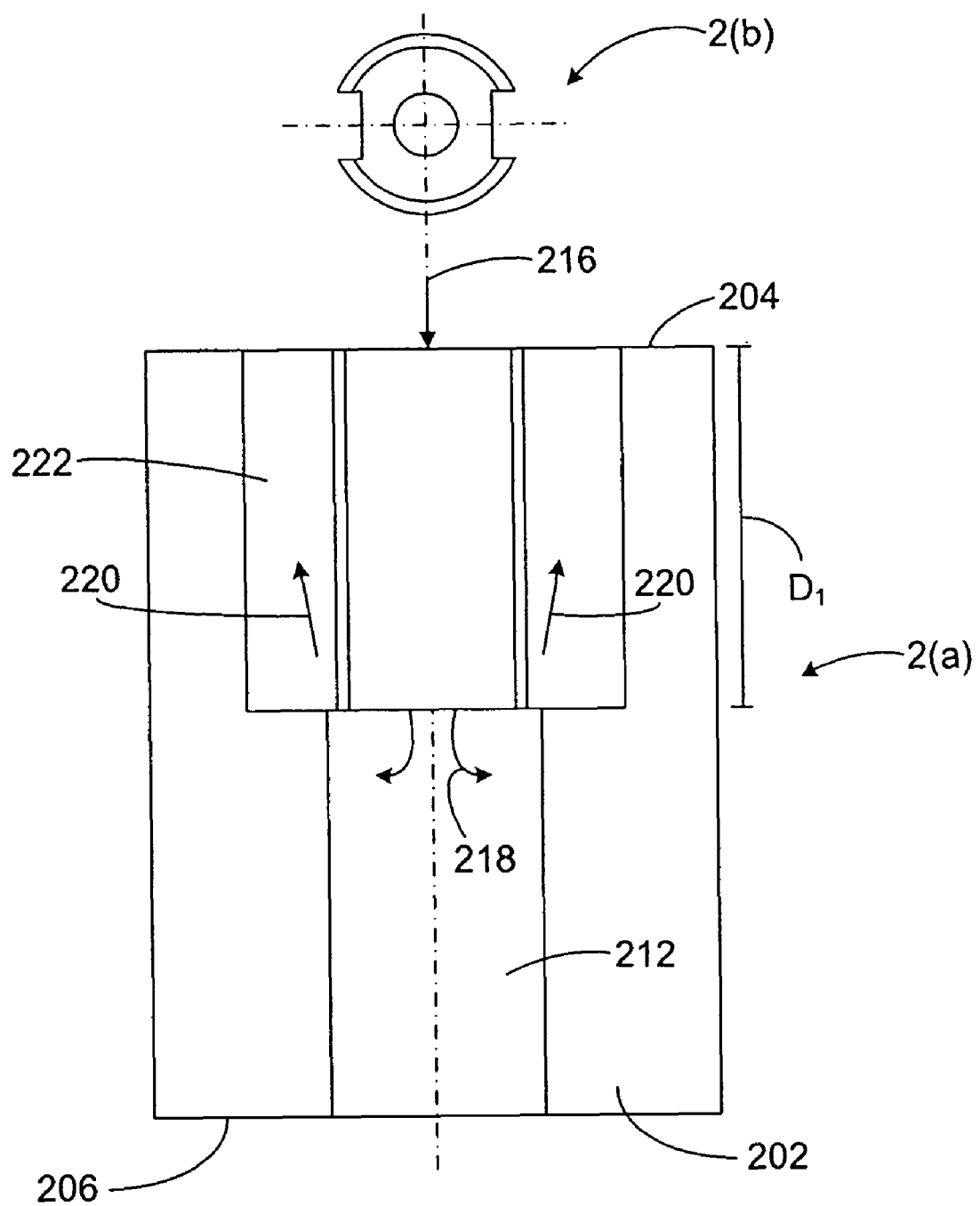
FIG. 2 is a view of the electrode shown in FIG. 1 and being used to form a cooling hole in a turbine airfoil.
Figure 3:
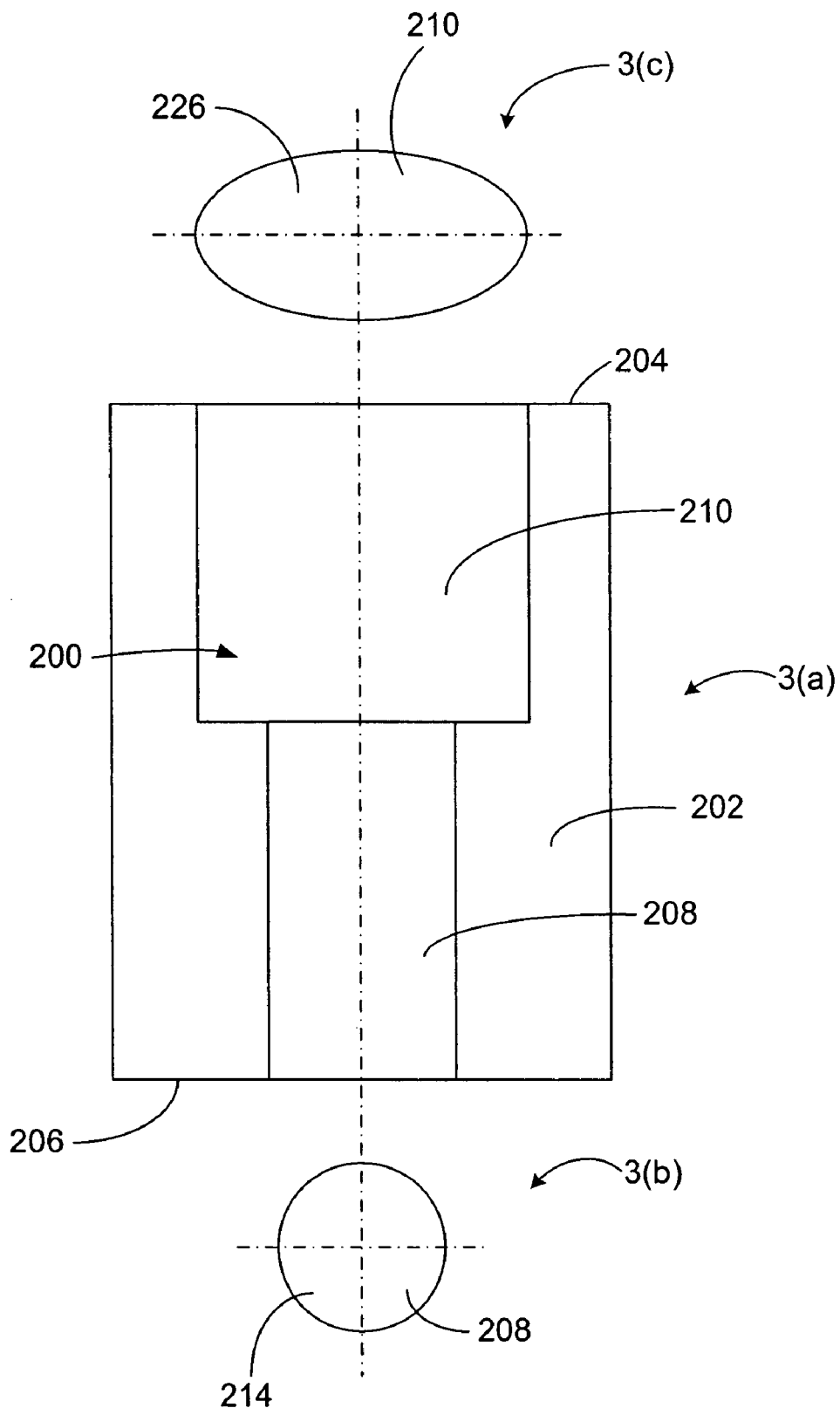
FIG. 3 is a cross-sectional view of the airfoil shown in FIG. 2 and including the cooling hole formed therethrough.

FIG. 2 illustrates electrode 100 being used to form a cooling hole 200 in an exemplary turbine airfoil 202. Specifically, FIG. 2 illustrates a side view 2(a) of electrode 100 being inserted through an external surface 204 of airfoil 202 towards an internal surface 206 of airfoil 202, and an end view 2(b) of the orientation of electrode second end 104 during the machining process. FIG. 3 illustrates a view of airfoil 202 after the machining process is complete and cooling hole 200 has been formed therein. Specifically, FIG. 3 illustrates a side view 3(a) of airfoil 202 including cooling hole 200, a cross-sectional view 3(b) of an inlet 208 of cooling hole 200; and a cross-sectional view 3(c) of an outlet 210 of cooling hole 200.

During the machining process, and specifically, prior to the operation of electrode 100, a starter hole 212 is formed in airfoil 202. In the exemplary embodiment, starter hole 212 is drilled using at least one of an electrochemical machining electrode, an electrical discharge machining electrode, and/or a laser. Further, in the exemplary embodiment, starter hole 212 has a first cross-sectional area 214 that in the exemplary embodiment is substantially circular. As will be appreciated by one skilled in the art, in an alternative embodiment, cross-sectional area 214 may have any shape suitable that facilitates forming cooling hole 200. Further, in the exemplary embodiment, starter hole 212 may be formed in airfoil 202 at various angles with respect to airfoil external surface 204, such as, but not limited to 0°, 90°, or any oblique angle between 0° and 90°.

During the machining process, and specifically, during the operation of electrode 100, electrode 100 is inserted into starter hole 212 through external surface 204 and is directed towards internal surface 206, as shown with arrow 216. Electrolyte fluid is channeled through electrode 100 to direct a charge from electrode 100. A portion 218 of current induced to electrode 100 is discharged from electrode tip 116 and a portion 220 of current induced to electrode 100 is discharged from uninsulated portions 112. As described in more detail below, in the exemplary embodiment, electric current 220 discharged from uninsulated portions 112 facilitates removing metal from a portion 222 of starter hole 212 to form an outlet 210 of cooling hole 200. In the exemplary embodiment, the metal is removed from starter hole 212 because of the electrochemical dissolution. In the exemplary embodiment, the removal of metal from starter hole 212 forms outlet 210 with a cross-sectional area 226 that is larger than starter hole cross-sectional area 214. Specifically, in the exemplary embodiment, the cross-sectional area 226 of outlet 210 is non-circular. More specifically, in the exemplary embodiment, the cross-sectional area 226 is substantially elliptical. As will be appreciated by one skilled in the art, electrode 100 can be fabricated to form outlet 210 with a cross-sectional area 226 having any shape and/or size.

In the exemplary embodiment, electrode 100 is inserted a distance $D_1$ into starter hole 212. Operation of electrode 100 facilitates forming cooling hole 200 with a discrete inlet 208 and outlet 210. Specifically, inlet 208 is defined by a portion of starter hole 212 that is not machined with electrode 100, and outlet 210 is defined by a portion of starter hole 212 that is machined with electrode 100. Accordingly, in the exemplary embodiment, inlet 208 is formed with a substantially circular cross-sectional area 214 and outlet 210 is formed with a substantially elliptical cross-sectional area 226. Moreover, in the exemplary embodiment, inlet 208 is formed on internal surface 206 of airfoil 202, and outlet 210 is formed on external surface 204 of airfoil 202.

In the exemplary embodiment, cross-sectional areas 214 and 226 may have at least one of a smooth, rough, and/or corrugated surface finish. As such, an overall size and shape of cooling hole inlet 208 may be variably selected to facilitate metering an amount of airflow through cooling hole 200. Moreover, cooling hole outlet 210 may be sized and shaped to facilitate increasing an amount of heat transfer inside airfoil 202 and/or cooling downstream from cooling hole 200. Moreover, the orientation and cross-sectional shape of cooling hole outlet 210 facilitates reducing stress concentrations that may be induced on areas of airfoil external surface 204 defining cooling hole 200. In particular, the orientation and shape of outlet 210 may be variably selected to facilitate reducing stresses in airfoils having a relatively thin trailing edge.

In one embodiment, a method for forming a cooling hole in an object is provided. The method includes drilling a starter hole in the object, providing an electrochemical machining electrode that includes insulation that extends only partially around the electrode, and inserting the electrode into the starter hole to form a cooling hole in the object that has an inlet defined by a first cross-sectional area and an outlet defined by a second cross-sectional area. In the exemplary embodiment, the method includes forming the cooling hole inlet with a substantially circular cross-sectional area and forming the cooling hole outlet with a non-circular cross-sectional area. In one embodiment, the method includes drilling the starter hole with at least one of an electrochemical machining electrode, an electrical discharge machining electrode, and a laser. In another embodiment, the method includes providing an electrode having insulation only on a first side and a diametrically second side of the electrode. In a further embodiment, the method includes circulating electrolyte fluid through the electrode to facilitate removing material from the starter hole. In the exemplary embodiment, the method includes forming the cooling hole in a turbine engine airfoil.

The above-described systems and methods enable a cooling hole to be formed with differing cross-sectional areas that facilitate metering an amount of air entering the cooling hole, and enhancing heat transfer inside the airfoil and/or downstream of the cooling hole. Formation of the cooling hole as described herein facilitates reducing stress concentrations that may be induced on areas of airfoil defining the cooling hole.

As used herein, an element or step recited in the singular and proceeded with the word "a" or "an" should be understood as not excluding plural said elements or steps, unless such exclusion is explicitly recited. Furthermore, references to "one embodiment" of the present invention are not intended to be interpreted as excluding the existence of additional embodiments that also incorporate the recited features.

Exemplary embodiments of systems and methods for forming cooling holes in an airfoil are described above in detail. The systems and methods illustrated are not limited to the specific embodiments described herein, but rather, components of the system may be utilized independently and separately from other components described herein. Further, steps described in the method may be utilized independently and separately from other steps described herein.

While the invention has been described in terms of various specific embodiments, those skilled in the art will recognize that the invention can be practiced with modification within the spirit and scope of the claims.

What is claimed is:

1. A method for forming a hole in an object, said method comprising: forming a starter hole in the object; providing an electrochemical machining electrode that includes insulation that extends only partially around the electrode; and inserting the electrode into the starter hole to form a hole in the object that has an inlet defined by a first cross-sectional area that is substantially circular and an outlet defined by a second cross-sectional area wherein the second cross-sectional area is substantially elliptical and non-circular.

2. A method in accordance with claim 1 wherein drilling a starter hole in the object further comprises drilling the starter hole with at least one of an electrochemical machining electrode, an electrical discharge machining electrode, and a laser.

3. A method in accordance with claim 1 wherein providing an electrochemical machining electrode further comprises providing an electrode having insulation only on a first side and a diametrically opposite second side of the electrode.

4. A method in accordance with claim 1 further comprising circulating electrolyte fluid through the electrode to facilitate removing material from the starter hole.

5. A method in accordance with claim 1 wherein inserting the electrode into the starting hole further comprises forming a cooling hole in a turbine engine component.

6. An electrochemical machining (ECM) apparatus comprising: an electrode; and insulation that extends only partially about said electrode, said insulation is oriented to cause said electrode to form a hole having an inlet defined by a first cross-sectional area that is substantially circular and an outlet defined by a second cross-sectional area, wherein the second cross-sectional area is substantially elliptical and non-circular.

7. An ECM electrode in accordance with claim 6 wherein said electrode is configured to form the hole outlet on an external surface of an object and to form the hole inlet on an internal surface of the object, wherein the internal surface is opposite the external surface.

8. An ECM electrode in accordance with claim 6 wherein said insulation extends only across a first side and a second side of the electrode, wherein said second side is diametrically opposite said first side.

9. An ECM electrode in accordance with claim 6 wherein said electrode circulates electrolyte fluid to facilitate removing material from the hole.

10. An ECM electrode in accordance with claim 6 wherein said electrode is configured to form a cooling hole in a turbine engine component.

11. A system for machining holes in a turbine engine component, said system comprising an electrochemical machining (ECM) apparatus comprising: an electrode; and insulation that extends only partially about said electrode, said insulation is oriented to cause said electrode to form a hole having an inlet defined by a first cross-sectional area that is substantially circular and an outlet defined by a second cross-sectional area, wherein the second cross-sectional area is substantially elliptical and non-circular.

12. A system in accordance with claim 11 wherein said electrode is configured to form the hole outlet on an external surface of the component and to form the hole inlet on an internal surface of the component, wherein the internal surface is opposite the external surface.

13. A system in accordance with claim 11 wherein said insulation extends only across a first side and a second side of the electrode, wherein said second side is diametrically opposite said first side.

14. A system in accordance with claim 11 wherein said electrode circulates electrolyte fluid to facilitate removing material from the hole.

* * * * *